No. 736,624. PATENTED AUG. 18, 1903.
D. T. PITKETHLY & J. C. HAYES.
CLAMP OR DEVICE FOR STOPPING LEAKS IN PIPES.
APPLICATION FILED JUNE 4, 1902.
NO MODEL.

WITNESSES:
John A. Enos.
Marian S. Rhodes.

INVENTORS
David T. Pitkethly
Jerome C. Hayes
BY
E. M. Marble
ATTORNEY

No. 736,624. Patented August 18, 1903.

UNITED STATES PATENT OFFICE.

DAVID T. PITKETHLY AND JEROME C. HAYES, OF NEW YORK, N. Y.

CLAMP OR DEVICE FOR STOPPING LEAKS IN PIPES.

SPECIFICATION forming part of Letters Patent No. 736,624, dated August 18, 1903.

Application filed June 4, 1902. Serial No. 110,148. (No model.)

*To all whom it may concern:*

Be it known that we, DAVID T. PITKETHLY and JEROME C. HAYES, residing at New York, N. Y., have invented certain new and useful Improvements in Clamps or Devices for Stopping Leaks in Pipes and Fittings, of which the following is a specification.

Our invention relates to a clamp or device for stopping leaks between pipes and fittings, and particularly to a semidetachable device for that purpose, which will be hereinafter more fully described, and pointed out in the claims.

The object of the invention is to produce a clamp or device which may be used to stop leaks in pipes or between pipes and pipe-fittings and after the leak has been fully stopped to remove a portion of the device for use upon other pipes in like manner, thus making our clamp or leakage device more serviceable and much cheaper than any similar device heretofore produced.

In the devices heretofore produced for stopping leakages between pipes and fittings or in pipes they have been so constructed that after they are placed on the pipe and forced up against the fitting they must necessarily remain there, thus rendering the device as an entirety cumbersome and unserviceable for any other pipe.

Figure 1:
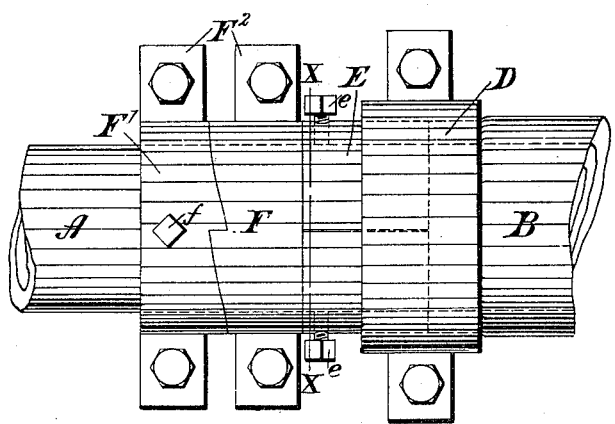
Figure 2:
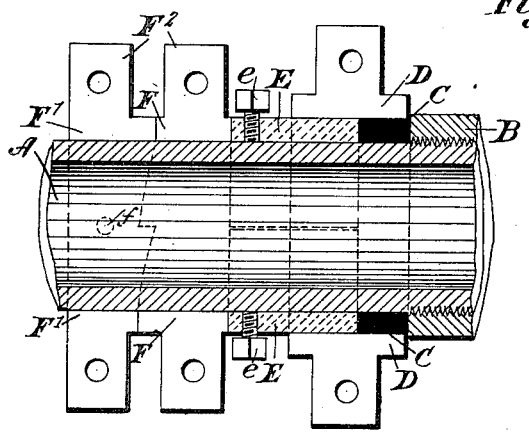
Figure 3:
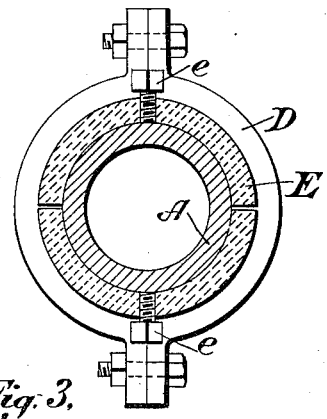
Figure 4:
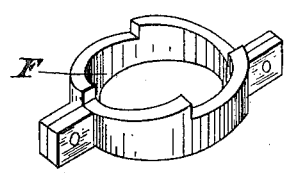
Figure 5:
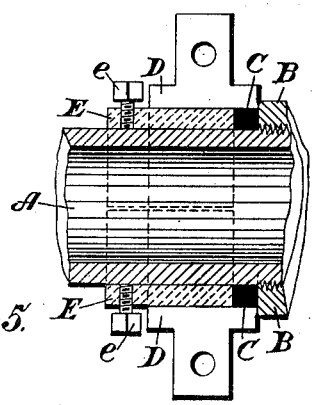

In the drawings accompanying our application, and which form a part thereof, Figure 1 represents a side plan view showing the entire device or clamp in position ready for use. Fig. 2 is a longitudinal sectional view of said clamp, showing the parts thereof as arranged when the device is in use and before the removable part has been detached. Fig. 3 is a cross-section through the line X X of Fig. 1, showing the relative position of the parts when placed on the pipe for use. Fig. 4 is a perspective view of the ring F, one of the detachable parts of the clamp. Fig. 5 is a longitudinal vertical section of the clamp or device for stopping leaks with the detachable portion of said device removed.

In the drawings, A represents a pipe which enters into the joint of a leaky fitting.

B is the fitting in which the leak occurs.

C is an annular packing-ring.

D is a two-part confining-ring to inclose the packing-ring and portions of the divisible gland, which confining-ring may be united together by lugs or other suitable devices.

E represents a divisible gland-ring.

F and F' are compressing-rings separated by a cam-face, so that ring F will be moved forward and push the gland-ring against the packing-ring when the ring F is revolved.

$F^2$ represents projecting lugs by which compressing-rings F and F' may be united.

$e\ e$ represent set-screws in gland-ring E. $f$ indicates such screws in ring F'.

The operation of our device is as follows: The device is placed on pipe A in the position shown in Figs. 1 and 2. Packing-ring C is first placed over or around pipe A and pressed snugly against the face of fitting B. Confining-ring D being of greater width than packing-ring C is placed over it and against the face of fitting B. Gland-ring E is next placed in position, shown partly, under ring D and against packing C. Rings F and F' are then placed on pipe A, and the whole is pressed snugly against the face of fitting B, and when in position ring F' is fixed to pipe A by set-screws $f\ f$. After all the parts have been placed in position and ring F' fixed ring F is turned by means of a wrench or spanner or its equivalent and rises or moves forward on the reciprocating faces of ring F' and forces gland-ring E against packing-ring C and presses packing C against face of fitting B and over the leak, thus stopping it effectually. The confining-ring D being of greater width than packing C projects over it and leaves an opening or annular recess in which gland-ring E is inserted. Gland-ring E is of sufficient size to fit snugly over pipe A and under ring D and of ample width to allow the placing of set-screws $e\ e$ after it has been driven far enough to stop the leak. When set-screws $e\ e$ are inserted in E, the action of the screws tends to lift the sections of E away from pipe A and bind them against ring D, holding them securely in place. When the leak has been stopped and ring E fixed, rings F and F' may be removed and used again.

In another application for Letters Patent, filed June 4, 1902, Serial No. 110,147, we have claimed in combination a confining-ring, a packing-ring, and a gland-ring provided with holding means engaging the pipe; also, the combination of a confining-ring with a gland-ring having holding devices and adjustable removable compressing means for forcing the gland against a packing-ring. Such inventions, therefore, we do not claim herein.

Having thus fully described our invention and its mode of operation, what we claim, and desire to secure by Letters Patent, is—

1. In a device for stopping leaks in pipes and fittings the combination with packing and confining rings, of a gland-ring and two compressing-rings having coacting wedge or cam shaped faces for forcing the gland and packing rings into place, one of such compressing-rings rotatable with respect to the other.

2. In a device for stopping leaks in pipes and fittings the combination with packing and confining rings, of a gland-ring and two compressing-rings for forcing the gland and packing rings into place, said compressing-rings having wedge or cam shaped faces and one of said compressing-rings being rotatable with respect to the other, and the gland-ring having holding means.

In testimony whereof we have signed our names to this specification, in the presence of two subscribing witnesses, this 31st day of May, 1902.

DAVID T. PITKETHLY.
JEROME C. HAYES.

Witnesses:
JOHN A. ENOS,
MARIAN S. RHODES.